(12) United States Patent
Jun et al.

(10) Patent No.: US 9,016,069 B2
(45) Date of Patent: Apr. 28, 2015

(54) CONDENSATE WATER REMOVING APPARATUS FOR VEHICLE AIR CONDITIONERS

(71) Applicant: Kbautotech Co., Ltd., Chungcheongnam-do (KR)

(72) Inventors: Duck Chae Jun, Gyeonggi-do (KR); Dal Young Jung, Gyeonggi-do (KR); Tae Sung Kim, Gyeonggido (KR)

(73) Assignee: Kbautotech Co., Ltd., Chungcheongnam-Do (KR)

( * ) Notice: Subject to any disclaimer, the term of this patent is extended or adjusted under 35 U.S.C. 154(b) by 244 days.

(21) Appl. No.: 13/683,169

(22) Filed: Nov. 21, 2012

(65) Prior Publication Data

US 2013/0125563 A1    May 23, 2013

(30) Foreign Application Priority Data

Nov. 22, 2011  (KR) .................. 10-2011-0122069

(51) Int. Cl.
*F25B 21/02* (2006.01)
*F25B 21/04* (2006.01)
(Continued)

(52) U.S. Cl.
CPC .............. *F25B 21/04* (2013.01); *F25B 47/006* (2013.01); *B60H 1/00478* (2013.01); *B60H 1/3233* (2013.01); *B60N 2/5628* (2013.01); *B60N 2/5635* (2013.01); *B60N 2/5657* (2013.01)

(58) Field of Classification Search
CPC ... F25B 21/04; F25B 47/006; B60H 1/00478; B60H 1/3233; B60N 2/5628; B60N 2/5657; B60N 2/5635
USPC ................................ 62/3.3, 3.61, 3.4, 3.7, 3.6
See application file for complete search history.

(56) References Cited

U.S. PATENT DOCUMENTS 5,413,166 A * 5/1995 Kerner et al. ................. 165/58
5,715,684 A * 2/1998 Watanabe et al. ............. 62/3.2
(Continued)

FOREIGN PATENT DOCUMENTS

| CN | 1306613 | 8/2001 |
| CN | 101249811 | 8/2008 |

(Continued)

OTHER PUBLICATIONS

Korean Patent Office Action for Application No. 10-2011-0122069 dated May 13, 2013 (4 pages—Including Statement of Relevance).

*Primary Examiner* — Mohammad M Ali
(74) *Attorney, Agent, or Firm* — Micheal Best & Friedrich LLP

(57) ABSTRACT

A condensate water removing apparatus for vehicle air conditioners which quickly removes condensate water generated from a thermoelement assembly. The apparatus includes: a thermoelement assembly installed in an air channel that guides air sucked and blown by a blower fan for heating or cooling; a partition plate placed to come into contact with the thermoelement assembly so that it guides air when sucked air passes through the thermoelement assembly so as to become cooling or heating air, the partition plate partitioning the air channel into an air supply channel and an air discharge channel; and a moisture absorbing material covering the thermoelement assembly and extending from the air supply channel to the air discharge channel so that the moisture absorbing material absorbs condensate water generated from the air supply channel and guides the condensate water to the air discharge channel, thereby removing the condensate water in the air discharge channel.

9 Claims, 3 Drawing Sheets

(51) Int. Cl.
  *F25B 47/00*  (2006.01)
  *B60H 1/00*  (2006.01)
  *B60H 1/32*  (2006.01)
  *B60N 2/56*  (2006.01)

(56) References Cited

U.S. PATENT DOCUMENTS

| | | | | |
|---|---|---|---|---|
| 5,901,572 | A * | 5/1999 | Peiffer et al. | 62/480 |
| 6,002,081 | A * | 12/1999 | Sakuragi | 136/203 |
| 7,461,511 | B2 * | 12/2008 | Kim et al. | 62/3.3 |
| 7,559,204 | B2 * | 7/2009 | Hatamian et al. | 62/3.4 |
| 7,610,767 | B2 * | 11/2009 | Kadle et al. | 62/186 |
| 8,327,652 | B2 * | 12/2012 | Nakaguro | 62/94 |
| 8,769,978 | B2 * | 7/2014 | Nakaguro et al. | 62/271 |
| 2001/0005990 | A1 * | 7/2001 | Kim et al. | 62/3.1 |
| 2003/0152766 | A1 * | 8/2003 | Vargo et al. | 428/343 |
| 2005/0188849 | A1 * | 9/2005 | Yoneno et al. | 96/143 |
| 2006/0048520 | A1 * | 3/2006 | Huang et al. | 62/3.5 |
| 2007/0157628 | A1 * | 7/2007 | Onoue | 62/3.2 |
| 2007/0261413 | A1 * | 11/2007 | Hatamian et al. | 62/3.4 |
| 2008/0078186 | A1 * | 4/2008 | Cao | 62/3.2 |
| 2008/0168787 | A1 * | 7/2008 | Kameyama | 62/244 |
| 2011/0061403 | A1 * | 3/2011 | Jun et al. | 62/3.61 |
| 2011/0283554 | A1 * | 11/2011 | Kuhnau et al. | 34/79 |
| 2012/0167404 | A1 * | 7/2012 | Hartoka et al. | 34/76 |

FOREIGN PATENT DOCUMENTS

| | | |
|---|---|---|
| CN | 101476757 | 7/2009 |
| CN | 101535070 | 9/2009 |
| CN | 101626912 | 1/2010 |
| CN | 101932475 | 12/2010 |
| CN | 102001299 | 4/2011 |
| CN | 102019865 | 4/2011 |
| JP | 5885711 | 5/1983 |
| JP | 2000146220 | 5/2000 |
| JP | 2001097038 | 4/2001 |
| KR | 100553192 | 2/2006 |
| KR | 20100111726 | 10/2010 |

* cited by examiner

CONDENSATE WATER REMOVING APPARATUS FOR VEHICLE AIR CONDITIONERS

CROSS-REFERENCE TO RELATED APPLICATIONS

This application claims priority to Korean Patent Application No. 10-2011-0122069, filed Nov. 22, 2011, the entire contents of which are hereby incorporated by reference herein.

FIELD OF THE INVENTION

The present invention relates, in general, to condensate water removing apparatuses for vehicle air conditioners and, more particularly, to a condensate water removing apparatus for vehicle air conditioners which can quickly remove condensate water that is generated from a thermoelement when using the thermoelement in an air conditioner.

BACKGROUND

A vehicle is generally provided with ah HVAC (Heating, Ventilation, and Air-conditioning) system that is an air conditioning apparatus, in which the HVAC system can perform a variety of air conditioning functions, such as ventilation, cooling and heating, in the vehicle when a driver operates the system, thereby providing a comfortable air-conditioned environment to a driver and passengers of the vehicle. The HVAC system can be actuated when a driver or a passenger manipulates a control switch that is provided in a lower part of a right side of a steering wheel. In the HVAC system, an air ventilation passage can be controlled and an air conditioner compressor can be started by operating an automatic temperature control unit.

Further, a vehicle seat that provides a comfortable sitting feel to a person by a cushion is also provided with a variety of handy functional devices. In recent years, a heating or cooling apparatus has been installed in the vehicle seat. In an initial stage, vehicle seat heating apparatuses are generally used in which a heating wire is installed in a vehicle seat and provides a comfortable warm environment to a driver who drives in a winter season. However, such vehicle seat heating apparatuses are problematic in that they cannot perform a cooling operation although they can perform an efficient heating operation.

To overcome the above-mentioned problem, a thermoelement assembly is used to selectively cool or heat the vehicle seat. In a vehicle seat air conditioning apparatus using the thermoelement assembly as a heat source, a functional mesh is provided in which an air passage or an air ventilation structure that can allow air to freely pass is formed and air generated by the thermoelement assembly used as the heat source is supplied (blown) to the functional mesh so that the surface of the functional vehicle seat can be retained at a temperature desired by a person.

However, the thermoelement assembly that has been generally used in the HVAC system or in the vehicle seat air conditioning apparatus is problematic in that the thermoelement assembly generates condensate water during operation.

SUMMARY

Accordingly, the present invention has been made keeping in mind the above problems occurring in the related art, and the present invention is intended to propose a condensate water removing apparatus for vehicle air conditioners, which can quickly and efficiently remove condensate water that is generated from a thermoelement assembly during a cooling or heating operation.

In order to achieve the above object, according to one aspect of the present invention, there is provided a condensate water removing apparatus for vehicle air conditioners, including: a thermoelement assembly installed in an air channel that guides air sucked and blown by a blower fan for heating or cooling; a partition plate placed so as to come into contact with the thermoelement assembly so that the partition plate guides air when sucked air passes through the thermoelement assembly so as to become cooling air or heating air, the partition plate partitioning the air channel into an air supply channel and an air discharge channel; and a moisture absorbing material covering an outer surface of the thermoelement assembly and extending from the air supply channel to the air discharge channel so that the moisture absorbing material absorbs condensate water generated from the air supply channel and guides the condensate water to the air discharge channel.

In an embodiment, the thermoelement assembly may include: a thermoelement arranged to form a row; a heat exchanger fin mounted to a first surface of the thermoelement in such a way that the heat exchanger fin comes into contact with the air supply channel and performs heat transfer; and a heat dissipating fin mounted to a second surface of the thermoelement in such a way that the heat dissipating fin comes into contact with the air discharge channel and performs heat transfer.

In an embodiment, the moisture absorbing material may come into close contact with a side surface, an upper surface and a lower surface of the thermoelement assembly, excluding a front surface and a rear surface of the thermoelement assembly, through which blown air passes.

In an embodiment, a connection part of the moisture absorbing material may be placed on the upper surface or on the lower surface of the thermoelement assembly.

In an embodiment, a housing in which the thermoelement assembly is installed may be provided with a depressed mounting seat for seating the thermoelement assembly therein.

In an embodiment, an insulating member may be placed between the moisture absorbing material and the housing.

In an embodiment, the depressed mounting seat may be provided with at least one pressure protrusion that protrudes toward the thermoelement assembly so that the pressure protrusion holds the thermoelement assembly.

In an embodiment, the housing in which the thermoelement assembly is installed may be provided with a heat insulating hole that is formed through the housing at a location at which the housing comes into contact with the heat dissipating fin so that the housing prevents heat generated from the heat dissipating fin from being transferred through the housing.

In an embodiment, an empty region in which no moisture absorbing material is provided may be formed within a range extending from an air outlet end to a predetermined portion of the heat dissipating fin so that a part of the blown air can be discharged in a direction toward a lower surface of the heat dissipating fin.

In an embodiment, the thermoelement assembly may be installed in a housing of an air conditioner that is installed in a vehicle seat.

As described above, the condensate water removing apparatus for vehicle air conditioners according to the present invention can quickly remove condensate water generated from the thermoelement assembly during an operation by quickly moving the condensate water to the air discharge channel without allowing the condensate water to flow to the surroundings, thereby increasing the heating and cooling operational efficiency.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Reference will now be made in greater detail to a condensate water removing apparatus for vehicle air conditioners according to a preferred embodiment of the invention, an example of which is illustrated in the accompanying drawings.

Figure 1:
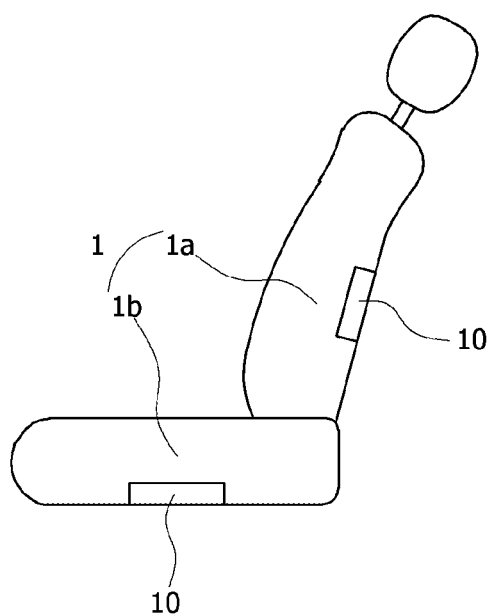
FIG. 1 is a view illustrating a condensate water removing apparatus for vehicle air conditioners, which is installed in a vehicle seat.
Figure 2:
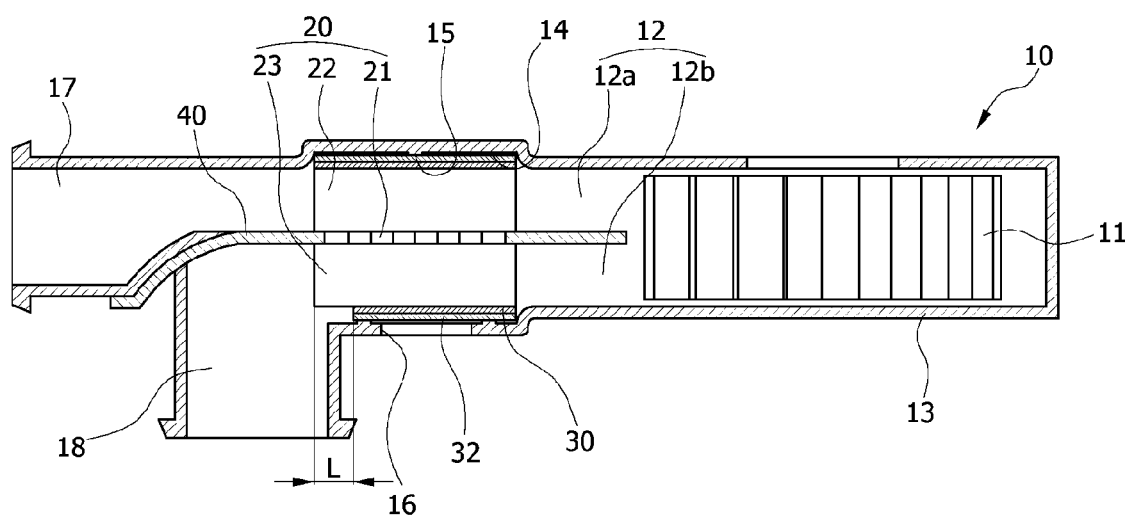
FIG. 2 is a sectional view illustrating the construction of the condensate water removing apparatus for vehicle air conditioners of FIG. 1.
Figure 3:
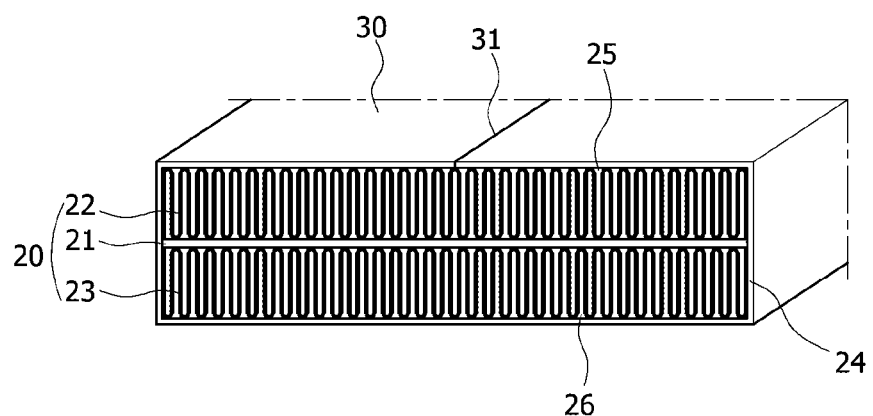
FIG. 3 is a perspective view illustrating a moisture absorbing material shown in FIG. 2.

FIG. 1 is a view illustrating a condensate water removing apparatus for vehicle air conditioners, which is installed in a vehicle seat. FIG. 2 is a sectional view illustrating the construction of the condensate water removing apparatus for vehicle air conditioners of FIG. 1. FIG. 3 is a perspective view illustrating a moisture absorbing material shown in FIG. 2. The condensate water removing apparatus for vehicle air conditioners according to the preferred embodiment of the present invention will be described, in which the apparatus is installed in a vehicle seat as shown in the drawings. However, it should be understood that the technique of the present invention which can remove condensate water that is generated from a thermoelement assembly 20 can be used in a variety of air conditioners that use such thermoelement assemblies for performing a cooling or heating operation, in addition to the vehicle seat, so that the present invention can be used in all kinds of air conditioners that use such thermoelement assemblies.

As shown in FIGS. 1 to 3, the condensate water removing apparatus for vehicle air conditioners according to a preferred embodiment of the present invention includes a thermoelement assembly 20 that is installed in an air channel 12 which guides air fed by a blower fan 11, and a moisture absorbing material 30 that covers the outer surface of the thermoelement assembly 20.

Here, an air conditioner 10 which is provided with the thermoelement assembly 20 is installed in a vehicle seat 1. The air conditioner 10 is installed in at least one of the back part 1a and the seat part 1b of the vehicle seat 1. In the back part 1a or in the seat part 1b of the vehicle seat 1, an air discharge port is provided so as to discharge air, which has been supplied from the air conditioner 10, to a passenger sitting in the vehicle seat 1.

The thermoelement assembly 20 includes a thermoelement 21 that is arranged to form a row and is operated by electric power, a heat exchanger fin 22 that is mounted to a first surface of the thermoelement 21 in such a way that heat can be transferred between them, and a heat dissipating fin 23 that is mounted to a second surface of the thermoelement 21 in such a way that heat can be transferred between them. A moisture absorbing material 30 is provided on the outer surface of the thermoelement assembly 20. Here, the moisture absorbing material 30 is mounted to the thermoelement assembly 20 having a hexahedral shape in such a way that the moisture absorbing material 30 is closely mounted to a side surface 24, an upper surface 25 and a lower surface 26 of the thermoelement assembly 20, excluding a front surface and a rear surface of the thermoelement assembly 20, through which the blown air passes. Here, it is preferred that the moisture absorbing material 30 be mounted to the thermoelement assembly 20 so as to cover all of the side surface 24, the upper surface 25 and the lower surface 26. However, the moisture absorbing material 30 may be provided on a part of the thermoelement assembly 20 as desired by a user. Here, even when the moisture absorbing material 30 is provided on a part of the thermoelement assembly 20, it is required to move condensate water, which is absorbed by the moisture absorbing material 30, in a direction from the upper surface 25 to the lower surface 26 so that the moisture absorbing material 30 must have a structure in which the moisture absorbing material 30 connects at least a part of the upper surface 25, the side surface 24 and the lower surface 26 to each other. When the moisture absorbing material 30 covers all of both side surfaces 24, the upper surface 25 and the lower surface 26, it is preferred that a connection part 31 of the moisture absorbing material 30 be placed on the upper surface 25 or on the lower surface 26, more preferably, on the central area of a selected surface.

Further, the air channel 12 of a housing 13 in which the thermoelement assembly 20 is installed is provided with a depressed mounting seat 14 having a predetermined depth. In the depressed mounting seat 14, a pressure protrusion 15 is formed at at least one location in such a way that the protrusion 15 protrudes toward the thermoelement assembly 20. Here, it is preferred that one pressure protrusion 15 be formed in a central area of a portion of the housing 13 in which the housing 13 comes into contact with the upper surface 25 and two pressure protrusions 15 be formed on opposite sides of a portion of the housing 13 in which the housing 13 comes into contact with the lower surface 26. Further, a heat insulating hole 16 is formed through the housing 13, in which the thermoelement assembly 20 is installed, at a location at which the housing 13 comes into contact with the heat dissipating fin 23. The heat insulating hole 16 restricts the heat transfer from the heat dissipating fin 23 to the housing 13 and restricts the heat transfer from the housing 13 to the heat dissipating fin 23. The heat insulating hole 16 may be formed through the housing 13 at least one of a location at which the housing comes into contact with the lower surface 26 of the heat dissipating fin 23 and locations at which the housing comes into contact with opposite side surfaces 24 of the heat dissipating fin 23.

Further, an insulating member 32 is provided between the housing 13 and the moisture absorbing material 30 that covers the thermoelement assembly 20.

In the housing 13, an air supply pipe 17 and an air outlet pipe 18 are formed so as to guide air that has passed through the thermoelement assembly 20. Here, the air supply pipe 17 is connected to the air supply channel 12a and the air outlet pipe 18 is connected to the air discharge channel 12b. When the air discharge channel 12b is configured to have a vertically bent structure, the heat dissipating fin 23 is placed in such a way that the air outlet end of the fin 23 does not come into contact with the housing 13. Further, an empty region L in which the moisture absorbing material 30 is not provided is formed within a region in which the housing comes into contact with the lower surface 26. When the empty region L is provided as described above, a part of air guided to the air outlet pipe 18 can be discharged in a direction toward the lower surface of the heat dissipating fin 23 so that the air can be efficiently discharged in a state in which a part of the thermoelement assembly 20 protrudes from the housing 13 so as to reduce the entire length of the housing.

The moisture absorbing material 30 is a material that can absorb condensate water and can receive the condensate water using an osmotic action.

When the above-mentioned condensate water removing apparatus for vehicle air conditioners according to the embodiment of the present invention performs a cooling operation, the temperature of a surface in which the heat exchanger fin 22 is installed is reduced, and the temperature of another surface in which the heat dissipating fin 23 is installed is increased by the electrically activated thermoelement 21. In the above state, a part of air that is blown by the blower fan 11 is cooled to become cool air while passing through the heat exchanger fin 22 that is installed in the air supply channel 12a. The cool air is fed to the vehicle seat 1 through the air supply pipe 17.

In the above state, the remaining part of the air blown by the blower fan 11 passes through the heat dissipating fin 23 that is installed in the air discharge channel 12b so that a heat exchanging operation is performed to dissipate heat from the heat dissipating fin 23. Air that has been processed by the heat exchanging operation is discharged to the outside through the air outlet pipe 18.

When the cooling operation is performed as described above, condensate water is generated from the heat exchanger fin 22. The condensate water that is generated from the heat exchanger fin 22 is absorbed by the moisture absorbing material 30 and the absorbed condensate water moves to the heat dissipating fin 23 through the moisture absorbing material 30. Here, the condensate water that has moved to a part of the moisture absorbing material 30 which is provided around the heat dissipating fin 23 passes through the heat dissipating fin 23 so that the condensate water vaporizes by coming into contact with the heat exchanged air. In other words, the moisture absorbing material 30 can remove the condensate water, which was generated by the heat exchanger fin 22, in the air discharge channel 12b.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A condensate water removing apparatus for vehicle air conditioners, comprising:
    a thermoelement assembly installed in an air channel that guides air sucked and blown by a blower fan for heating or cooling;
    a partition plate placed so as to come into contact with the thermoelement assembly so that the partition plate guides air when sucked air passes through the thermoelement assembly so as to become cooling air or heating air, the partition plate partitioning the air channel into an air supply channel and an air discharge channel; and
    a moisture absorbing material covering an outer surface of the thermoelement assembly and extending from the air supply channel to the air discharge channel so that the moisture absorbing material absorbs condensate water generated from the air supply channel and guides the condensate water to the air discharge channel,
    wherein the moisture absorbing material comes into close contact with a side surface, an upper surface and a lower surface of the thermoelement assembly, excluding a front surface and a rear surface of the thermoelement assembly, through which blown air passes.

2. The condensate water removing apparatus for vehicle air conditioners as set forth in claim 1, wherein the thermoelement assembly comprises:
    a thermoelement arranged to form a row;
    a heat exchanger fin mounted to a first surface of the thermoelement in such a way that the heat exchanger fin comes into contact with the air supply channel and performs heat transfer; and
    a heat dissipating fin mounted to a second surface of the thermoelement in such a way that the heat dissipating fin comes into contact with the air discharge channel and performs heat transfer.

3. The condensate water removing apparatus for vehicle air conditioners as set forth in claim 1, wherein a connection part of the moisture absorbing material is placed on the upper surface or on the lower surface of the thermoelement assembly.

4. The condensate water removing apparatus for vehicle air conditioners as set forth in claim 1, wherein a housing in which the thermoelement assembly is installed is provided with a depressed mounting seat for seating the thermoelement assembly therein.

5. The condensate water removing apparatus for vehicle air conditioners as set forth in claim 4, wherein an insulating member is placed between the moisture absorbing material and the housing.

6. The condensate water removing apparatus for vehicle air conditioners as set forth in claim 4, wherein the depressed mounting seat is provided with at least one pressure protrusion that protrudes toward the thermoelement assembly so that the pressure protrusion holds the thermoelement assembly.

7. The condensate water removing apparatus for vehicle air conditioners as set forth in claim 2, wherein a housing in which the thermoelement assembly is installed is provided with a heat insulating hole that is formed through the housing at a location at which the housing comes into contact with the heat dissipating fin so that the housing prevents heat generated from the heat dissipating fin from being transferred through the housing.

8. The condensate water removing apparatus for vehicle air conditioners as set forth in claim 2, wherein an empty region in which no moisture absorbing material is provided is formed within a range extending from an air outlet end to a predetermined portion of the heat dissipating fin so that a part of the blown air can be discharged in a direction toward a lower surface of the heat dissipating fin.

9. The condensate water removing apparatus for vehicle air conditioners as set forth in any one of claims 1, 2, and 3 to 8, wherein the thermoelement assembly is installed in a housing of an air conditioner that is installed in a vehicle seat.

\* \* \* \* \*